United States Patent
Carlson et al.

(10) Patent No.: US 9,483,100 B2
(45) Date of Patent: Nov. 1, 2016

(54) METHOD AND APPARATUS FOR POWER GATING HARDWARE COMPONENTS IN A CHIP DEVICE

(71) Applicant: Cavium, Inc., San Jose, CA (US)

(72) Inventors: David A. Carlson, Haslet, TX (US); Thucydides Xanthopoulos, Watertown, MA (US)

(73) Assignee: Cavium, Inc., San Jose, CA (US)

( * ) Notice: Subject to any disclaimer, the term of this patent is extended or adjusted under 35 U.S.C. 154(b) by 157 days.

(21) Appl. No.: 14/193,899

(22) Filed: Feb. 28, 2014

(65) Prior Publication Data

US 2015/0248154 A1  Sep. 3, 2015

(51) Int. Cl.
*G06F 1/32* (2006.01)
*G06F 1/00* (2006.01)
*H03K 17/00* (2006.01)

(52) U.S. Cl.
CPC ........... *G06F 1/3234* (2013.01); *G06F 1/3243* (2013.01); *Y02B 60/1239* (2013.01)

(58) Field of Classification Search
CPC ..................................................... G06F 1/3203
USPC ......................................................... 713/320
See application file for complete search history.

(56) References Cited

U.S. PATENT DOCUMENTS

| | | | | |
|---|---|---|---|---|
| 4,462,000 | A * | 7/1984 | Gottlieb et al. | ................. 330/51 |
| 8,356,194 | B2 | 1/2013 | Carlson et al. | |
| 8,427,071 | B2 * | 4/2013 | Liang et al. | ................... 315/291 |
| 8,581,637 | B2 * | 11/2013 | Paul et al. | ..................... 327/108 |
| 8,884,687 | B2 * | 11/2014 | Yoon et al. | .................... 327/544 |
| 2010/0123508 | A1 * | 5/2010 | Zha et al. | ..................... 327/408 |
| 2011/0198941 | A1 * | 8/2011 | Suzuki et al. | ................ 307/116 |
| 2014/0015590 | A1 | 1/2014 | Yoon et al. | |

OTHER PUBLICATIONS

Chouhan, A., et al., "A Novel Delay Minimization Technique for Low Leakagewide Fan-In Domino Logic Gates," *Computers and Devices for Communication (CODEC)*, pp. 1-4 (2012).

Roy, K., et al., "Leakage Current Mechanisms and Leakage Reduction Techniques in Deep-Submicrometer CMOS Circuits," *Proceedings of the IEEE*, 91(2): 305-327 (2003).

Tan, F.N., et al., "Power Gating Techniques on Platform Controller Hub," *Electronic Manufacturing Technology Symposium (IEMT), 2010 34th IEEE/CPMT International*, pp. 1-7 (2010).

Bsoul, A. A. M. and Wilton, S. J. E., "An FPGA Architecture Supporting Dynamically Controlled Power Gating," *Field-Programmable Technology (FPT), International Conference*, pp. 1-8 (2010).

(Continued)

*Primary Examiner* — Suresh Suryawanshi
(74) *Attorney, Agent, or Firm* — Hamilton, Brook, Smith & Reynolds, P.C.

(57) ABSTRACT

According to at least one example embodiment, a semiconductor device is configured to gate power supply to a hardware component through a transistor coupled to the hardware component. The transistor is operated by a controller in a manner to limit electric current dissipated to the hardware component during a transition period. The controller is configured to gradually turn on, or off, the hardware component during a transition period by controlling at least one input signal to the transistor. Gradual turning on, or off, of the hardware component reduces electric current leakage through the hardware component and diminishes any potential disturbance to a ground reference coupled to the hardware component.

14 Claims, 5 Drawing Sheets

(56) References Cited

OTHER PUBLICATIONS

Kong, U. C., et al., "PCH Power Gating Domains Implementation and Design Challenges," *Quality Electronic Design (ASQED), 2010 2nd Asia Symposium*, pp. 23-28 (2010).

Jiang, et al., "Benefits and Costs of Power-Gating Technique," *2005 International Conference on Computer Design*, pp. 559-566 (2005).

The Search Report from corresponding Taiwan application No. 104105811, Apr. 22, 2016.

* cited by examiner

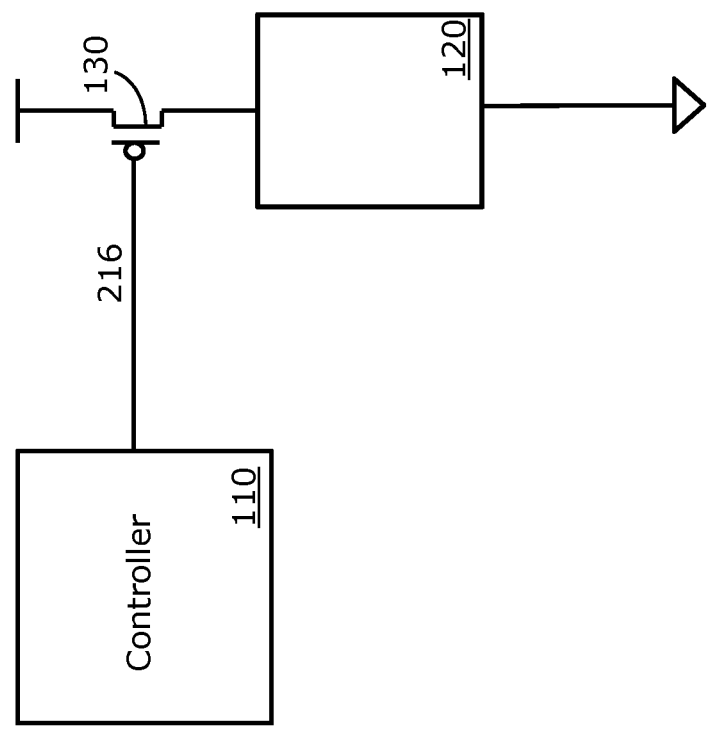

METHOD AND APPARATUS FOR POWER GATING HARDWARE COMPONENTS IN A CHIP DEVICE

BACKGROUND

Microprocessor design typically aims at providing high processing speed with as little power consumption as possible. In reducing power consumption, microprocessor design aims at reducing power dissipated across different components of an integrated circuit (IC). Specifically, power dissipation includes dynamic power dissipation and static power leakage. Dynamic power dissipation is due to, for example, clock signal oscillation and/or charging and discharging of capacitors in the IC. Static power leakage is typically due to current leakage through transistors even when they are turned off.

SUMMARY

According to at least one example embodiment, a semiconductor device having one or more hardware components, and a corresponding method comprise gating power supply to the hardware component through a transistor coupled to the hardware component. The transistor is operated by a controller in a manner to limit electric current dissipated to the hardware component during a transition period. In other words, the controller is configured to gradually turn on, or off, a hardware component of the one or more hardware components during a transition period by controlling at least one input signal to the transistor.

According to at least one aspect, in operating the transistor in a manner to limit electric current dissipated to the hardware component, the controller is configured to control a magnitude of an enabling signal applied to the transistor during the transition period.

A typical transistor may be viewed as including multiple gating elements, or transistor elements, for gating power supply to the hardware component. According to at least one aspect, in operating the transistor in a manner to limit electric current dissipated to the hardware component, the controller is configured to cause a first subset of the multiple gating elements to be turned on in a first phase of the transition period. In a second phase of the transition period, the controller causes a second subset of the multiple gating elements to be turned on. The controller may wait for one or more clock cycles after causing the first subset of the multiple gating elements to be turned on and before causing the second subset of the multiple gating elements to be turned on.

In order to gradually turn on, or off, a hardware component, the controller may, alternatively, use an enabling signal, that is applied to the transistor, with smooth or gradual transition between a high level and a low level of the magnitude of the enabling signal during the transition period.

The semiconductor device may include multiple hardware components, such as, core processor(s), coprocessor(s), memory component(s), the like, or a combination thereof. The controller maintains information indicative of a current status of each hardware component of the multiple hardware components. The controller further maintains information indicative of hardware components to which a change of status is to be applied, or information indicative of future statuses of the hardware components based, for example, on received requests of turning on, or off, hardware components. According to at least one aspect, a single hardware component is being turned on at any point of time. As such, the controller is configured to determine a hardware component to be turned on or off based on the maintained information, and gradually turn on the determined hardware component. According to at least one aspect, the controller may handle simultaneous switching for two hardware components if one of them is turned on and the other is turned off.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2B is a circuit diagram illustrating power gating of a hardware component of the semiconductor device, according to a second example embodiment;

DETAILED DESCRIPTION

A description of example embodiments of the invention follows.

Power dissipation typically includes dynamic power dissipation and power leakage. Dynamic power dissipation typically refers to power consumed due to state changes of flip-flops and other components of the IC. Power leakage, however, usually refers to dissipated power due to electric current leakage through transistors within the IC even when the transistors are turned off. Clock gating reduces dynamic power dissipation. Specifically, by stalling or slowing a clock of a chip over a time period, flip-flop switching is stopped or reduced over the same time period. As such, switching power dissipation within the chip decreases. However, clock gating does not reduce power leakage of the chip.

Leakage power typically accounts for about 30% or more of a chip's power budget. As such, leakage power represents a significant limiting factor when it comes to improving power consumption efficiency of a semiconductor chip. In particular, as the size of semiconductor chips has been getting smaller, leakage power is becoming more of an obstacle to reducing corresponding power consumption. In many electronic devices, especially mobile devices, reducing power consumption is a pressing goal, which makes addressing leakage power in semiconductor chips an important challenge to overcome in semiconductor design.

Figure 1:
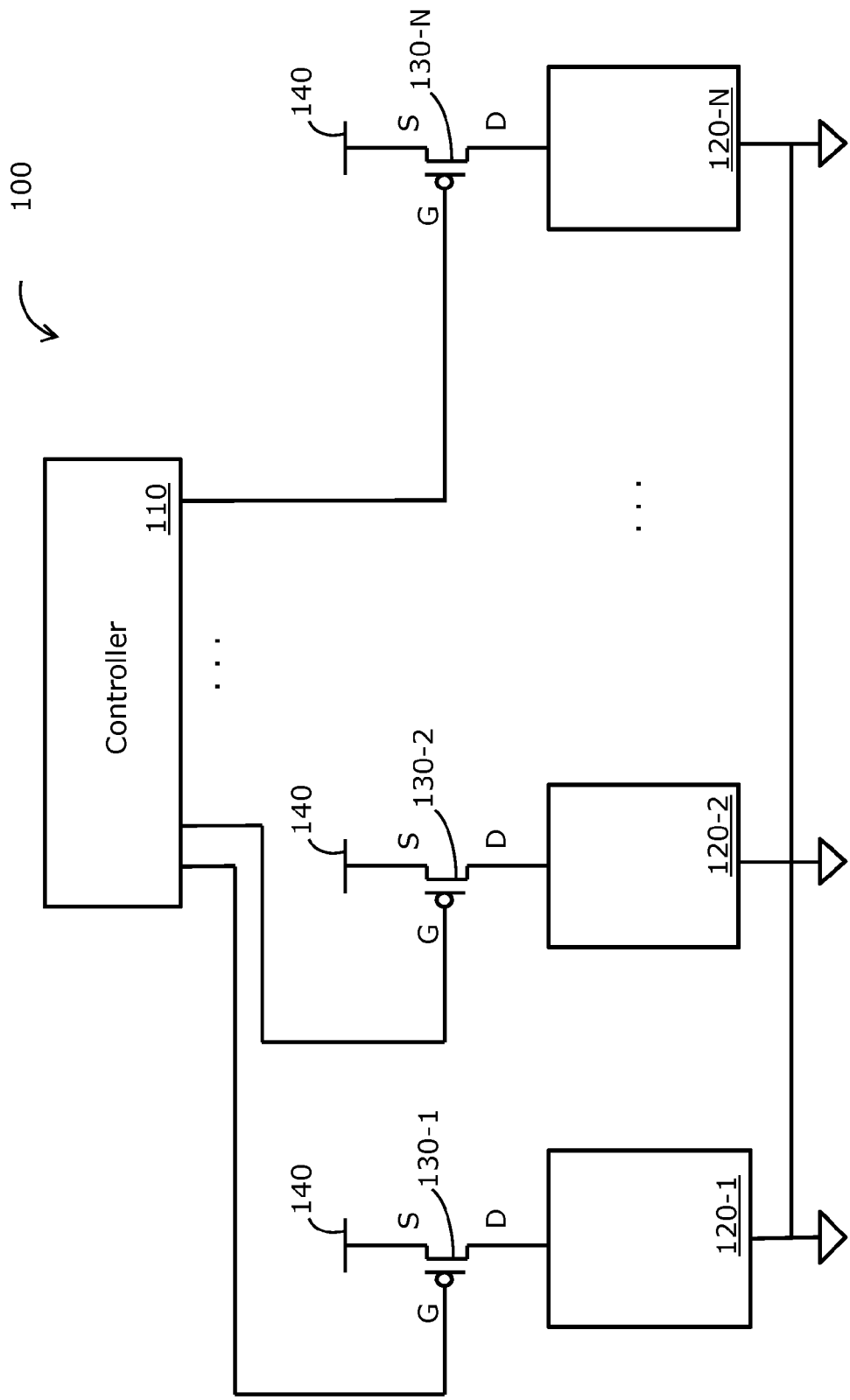
FIG. 1 is a circuit diagram of a semiconductor device employing power gating, according to at least one example embodiment.

FIG. 1 is a circuit diagram of a semiconductor device 100 employing power gating, according to at least one example embodiment. The semiconductor device 100 includes multiple hardware components 120-1-120-N, where N is an integer number. The hardware components 120-1-120-N, also referred to individually or collectively as 120, include one or more core processors, one or more coprocessors, one or more on-chip memory components, a bus interface, the like, or a combination thereof. For example, the semiconductor device 100 may be a multi-core processor. According to at least one example embodiment, each of the hardware components 120-1-120-N is coupled to a corresponding power gating device 130-1-130-N, also referred to individually or collectively as 130. According to at least one aspect, each power gating device 130 is a p-type metal oxide semiconductor (PMOS) transistor. For each power gating PMOS device 130, the source (S) terminal is coupled to a power supply 140, the drain (D) terminal is coupled to the corresponding hardware component, and the gate (G) terminal is coupled to a controller 110.

According to at least one example embodiment, the controller 110 is configured to turn the power to each hardware component 120 on or off by causing the source-drain (S-D) connection of each corresponding PMOS power gating device 130 to be closed or open, respectively. In general terms, the controller 110 is configured to control power dissipated to each hardware component 120 by controlling input to the G terminal of each corresponding PMOS power gating device 130. According to at least one aspect, each PMOS power gating device 130 acts as a switch, that is controlled by the controller 110, for the corresponding hardware component 120. When the S-D connection of the PMOS power gating device 130 is open, little or no electric current dissipates to the corresponding hardware component 120.

Figure 2A:
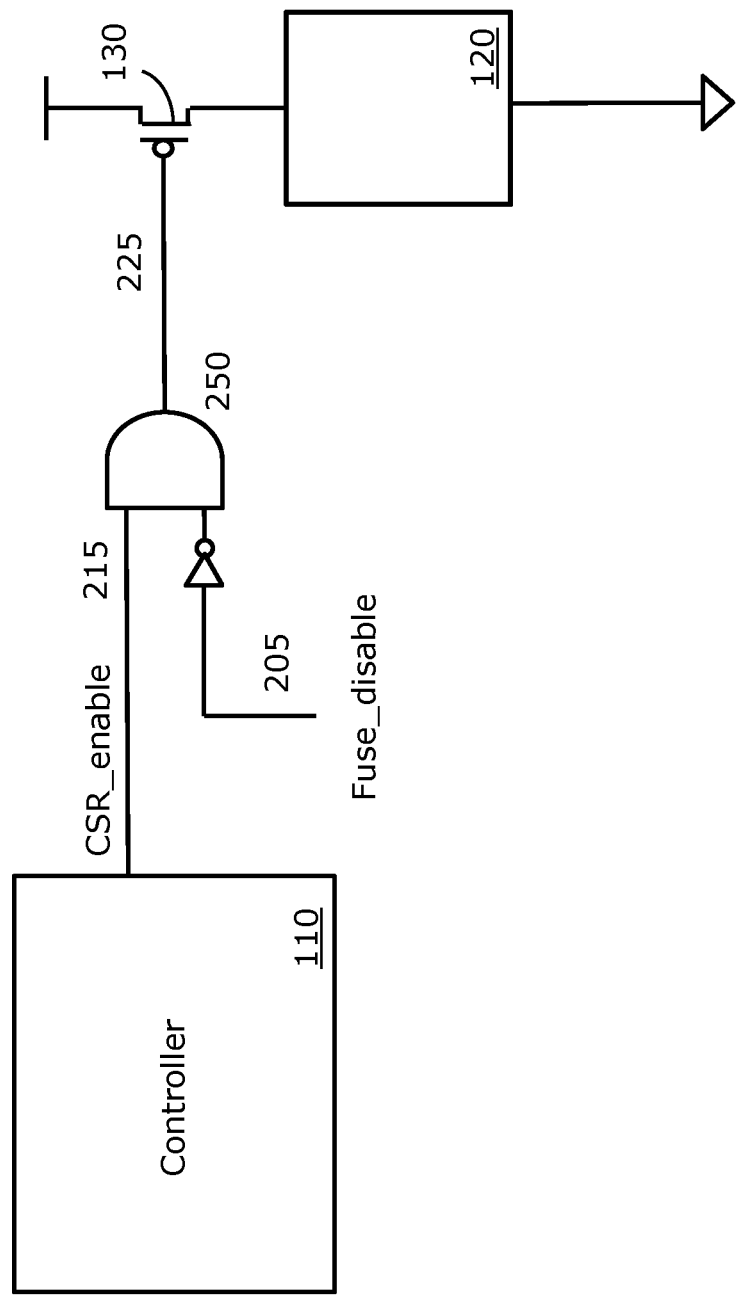
FIG. 2A is a circuit diagram illustrating power gating of a hardware component of the semiconductor device, according to a first example embodiment.

FIG. 2A is a circuit diagram illustrating power gating of a hardware component 120 of the semiconductor device 100, according to a first example embodiment. According to one aspect of the invention, a one-bit signal 225 is fed to the G terminal of the PMOS power gating device 130. When the one-bit signal 225 is at low voltage level, the S-D connection of the PMOS power gating device 130 is closed and electric current is flowing to the hardware component 120. However, when the one-bit signal 225 is at high voltage level, the S-D connection of the PMOS power gating device 130 is open and no electric current is flowing to the hardware component 120. According to at least one aspect, the one-bit signal 225 is the output of an AND gate 250 having as input a "CSR-enable" one-bit signal 215 provided by the controller 110. The second input of the AND gate 250 is obtained by inverting a "Fuse_disable" one-bit signal 205. The "Fuse_disable" one-bit signal 205 is set to low voltage level constantly. As such, the controller 110 controls the S-D connection of the PMOS power gating device 130 through the "CSR_enable" one-bit signal 215. That is, if the "CSR_enable" one-bit signal 215 is at high voltage level, the one-bit signal 225 is also at high voltage level and the S-D connection is open. Consequently, the hardware component 120 is turned off. However, if the "CSR_enable" one-bit signal 215 is at low voltage level, the one-bit signal 225 is also at low voltage level and the S-D connection is closed resulting in the hardware component 120 being turned on. Specifically, by changing the voltage level of the "CSR-enable" one-bit signal 215, the controller is enabled to turn the hardware component on or off given that the "Fuse_disable" one-bit signal 205 is set constantly to low voltage level.

FIG. 2B is a circuit diagram illustrating power gating of a hardware component 120 of the semiconductor device 100, according to a second example embodiment. In the configuration of FIG. 2B, the controller 110 applies the "CSR_enable" signal 216 directly to the PMOS power gating device 130. When the "CSR_enable" signal 216 is at low voltage level, the S-D connection of the PMOS power gating device 130 is closed and electric current is flowing to the hardware component 120. However, when the "CSR_enable" signal 216 is at high voltage level, the S-D connection of the PMOS power gating device 130 is open and no electric current is flowing to the hardware component 120.

According to at least one aspect, the controller 110 is enabled to reduce power leakage within the semiconductor device 100 by turning off one or more hardware components 120 when they are not active. The controller 110 provides a separate "CSR-enable" signal 215 or 216 for each hardware component 120, therefore controlling each hardware component 120 separately. According to at least one example embodiment, a hardware component 120 may be turned off permanently, for example, by constantly keeping the corresponding "CSR-enable" signal 215 or 216 at high-voltage level. Alternatively, a hardware component 120 may be turned off permanently by using a different configuration where the inverted version of the "Fuse_disable" one-bit signal 205 is applied directly to the G terminal of the corresponding PMOS power gating device 130. According to yet another embodiment, a fuse in a circuit configuration is blown in a way to cause a high level voltage to be constantly applied to the G terminal of a PMOS power gating device 120.

When turning on a hardware component 120, the voltage level of the signal applied to the corresponding PMOS power gating device 130, may be changed instantly from high level to low level. The instant change of the voltage level of the signal applied to the G terminal of the PMOS power gating device 130 results in a fast change in potential difference across the corresponding hardware component 120. Also, substantial electric current leakage through the corresponding hardware component 120 occurs as a result of the fast change in potential difference across the same hardware component 120. In other words, the hardware component 120 behaves like a capacitor during the transition period from one state to another, e.g., from on to off or vice versa. Besides the substantial electric current leakage through the hardware component 120, the fast change in potential difference across the same hardware component 120 causes a shift in the ground level during the transition period, and, therefore, may affect the performance of other hardware components 120 coupled to the same reference ground.

Figure 3A:
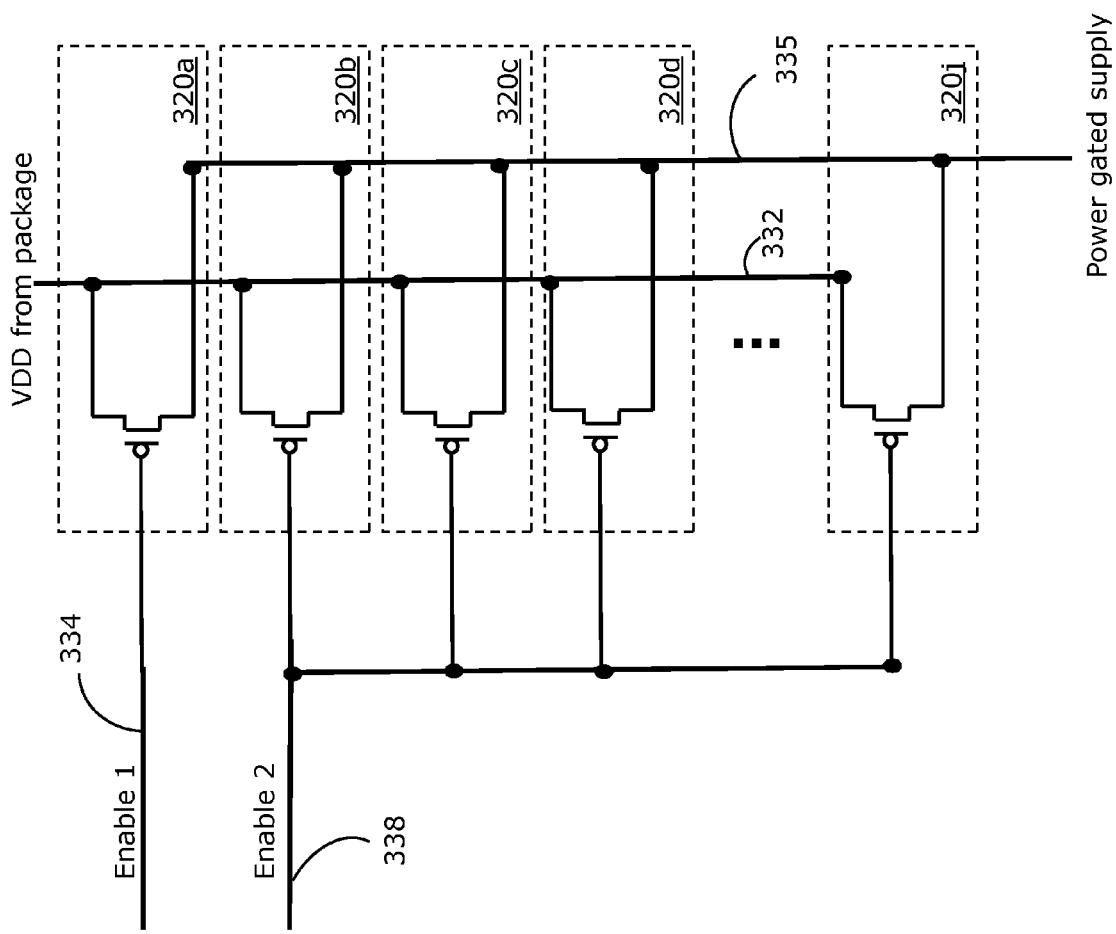
FIG. 3A is a block diagram illustrating a representation of the structure of power gating transistors and a mechanism of gradually powering up the hardware component, according to a first example embodiment.

FIG. 3A is a block diagram illustrating a representation of the structure of the power gating transistors and a mechanism of gradually powering up the hardware component, according to a first example embodiment. The power gating transistors may be viewed as multiple parallel sub-transistors or gating elements, e.g., 320a-320j. The S terminal of each gating element 320a-320j is tied to VDD from the package 332. The D terminals of the gating elements 320a-320j are coupled together to provide a power gated supply 335. According to at least one example embodiment, the input signal applied to the G terminal of the PMOS power gating device 130 is split into two separate input signals 334 and 338. For example, the input signal 334 may service a small portion, e.g., 10%, of the sub-transistors or gating elements 320a-320j, while the input signal 338 services the other larger portion, e.g., 90%, of the sub-transistors or gating elements 320a-320j in the PMOS power gating device 130.

According to at least one example embodiment, during a transition period, transitioning from high level voltage to low level voltage at the G terminal or vice versa, the switching in state is applied in two phases. In a first phase, switching in Voltage state of the G terminal is applied only for the input signal 334 until transition is complete for the small portion of sub-transistors, e.g., 320a. At the end of the first transition phase the potential difference between the S and D terminals is close to the supply voltage VDD, e.g., $V_{SD} \approx$ VDD−10 millivolts (mV). In a second phase, the switching in voltage state is applied at the input signal 338. At the end of the second phase, only a slight change in the potential difference between the S and D terminals is achieved and the drain-source potential difference is only few millivolts closer to the supply voltage VDD, e.g., $V_{SD} \approx$ VDD−2 mV. According to at least one aspect, a delay is enforced between the time the first transition phase is started and the time the second transition phase is started. The two-phase transition results in slower change in the potential across the hardware component 120 compared to instant transition in voltage state. As such, this reduces the magnitude of the electric current, through the transistor, during the transition phase.

Figure 3B:
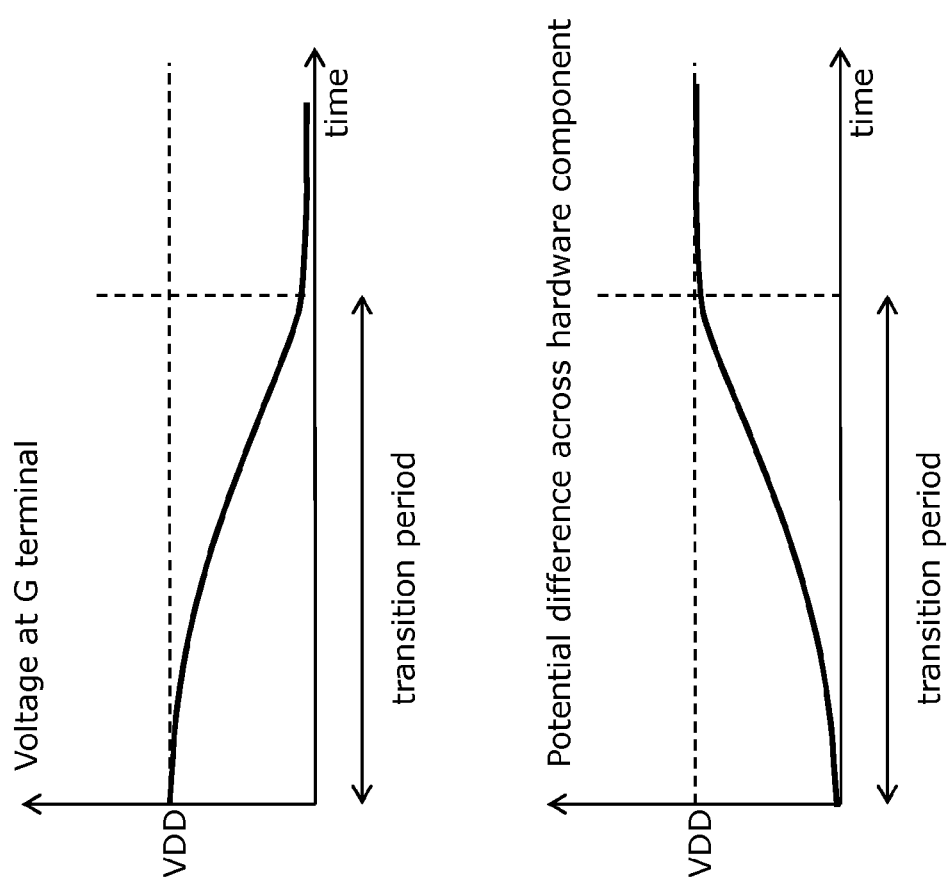
FIG. 3B shows two diagrams illustrating another mechanism of gradually powering on a transistor, according to a second example embodiment.

FIG. 3B shows two diagrams illustrating another mechanism of gradually powering on a transistor, according to a second example embodiment. The plot in the upper diagram of FIG. 3B represents a smooth transition of the input signal, e.g., 216 or 225, applied to the G terminal of the PMOS power gating device 130. In other words, when transitioning from high level voltage to low level voltage, or vice versa, the input signal transitions gradually over a transition period instead of instantly. The gradual transition in the input signal applied to the G terminal of the PMOS power gating device 130 results in relatively slower change in the potential difference across the corresponding hardware component 120, compared to instant transition scenario. As such, less electric current is present during the longer state transition period and any effect on the reference ground level is diminished.

According to at least one example embodiment, the controller 110 is configured to receive instructions from software, e.g., operating system, running on the semiconductor device 100 indicating one or more hardware components 120 to be turned on or off. According to at least one aspect, the controller 110 maintains, e.g., in a register, indication(s) of the hardware components 120 for which a change in state, e.g., from off to on or vice versa, is to be applied according to the instructions from the software. According to another aspect, the controller 110 maintains, e.g., in another register, indication(s) of currents statuses of the hardware components 120, e.g., which ones are on and which ones are off. For example, the controller may use one bit per hardware component in each of the registers. The controller 110 is also configured to use the information indicative of changes in status of one or more hardware components 120 as well as the information indicative of current statuses of the hardware components in carrying on the changes.

According to at least one example embodiment, a single hardware component 120 is turned on at any time point. Turning on hardware components 120 one at a time prevents substantial cumulative power leakage from multiple hardware components 120 from occurring. Also, avoiding turning on multiple hardware components 120 simultaneously prevents cumulative potential difference across the multiple hardware components 120 from shifting the ground reference level. According to at least one aspect, the controller may allow the statuses of two hardware components to be changed if one of them is to be turned on and the other is to be turned off.

While this invention has been particularly shown and described with references to example embodiments thereof, it will be understood by those skilled in the art that various changes in form and details may be made therein without departing from the scope of the invention encompassed by the appended claims.

What is claimed is:

1. A semiconductor device comprising:
    a hardware component;
    a transistor, coupled to the hardware component, for gating power supply to the hardware component; and
    a controller configured to operate the transistor in a manner to limit electric current dissipated to the hardware component during a transition period by gradually decreasing, or gradually increasing, a magnitude of an input signal of the transistor during the transition period.

2. The semiconductor device as recited in claim 1, wherein the transistor includes multiple gating elements for gating power supply to the hardware component.

3. The semiconductor device as recited in claim 1, wherein the semiconductor device includes multiple hardware components.

4. The semiconductor device as recited in claim 3, wherein the multiple hardware components are multiple core processors.

5. The semiconductor device as recited in claim 3, wherein the controller is further configured to maintain information related to current states of the multiple hardware components.

6. The semiconductor device as recited in claim 5, wherein the controller is further configured to maintain information indicative of states of the multiple hardware components requested by software associated with the semiconductor device.

7. The semiconductor device as recited in claim 6, wherein the controller is further configured to determine a hardware component of the multiple hardware components for switching a corresponding state based on the information related to the current states and the information indicative of requested states of the multiple hardware components, the hardware component determined being gradually turned on during the transition period by limiting electric current dissipated to the hardware component determined.

8. A method comprising:
    operating a transistor coupled to a hardware component;
    employing a transistor coupled to a hardware component, of one or more hardware components in a chip device, to gate power supply to the hardware component; and
    operating, by a controller, the transistor in a manner to limit electric current dissipated to the hardware component during a transition period by gradually decreasing, or gradually increasing, a magnitude of an input signal of the transistor during the transition period.

9. The method as recited in claim 8, wherein the transistor includes multiple gating elements for gating power supply to the hardware component.

10. The method as recited in claim 8, wherein the semiconductor device includes multiple hardware components.

11. The method as recited in claim 10, wherein the multiple hardware components are multiple core processors.

12. The method as recited in claim 10 further comprising maintaining, by the controller, information related to current states of the multiple hardware components.

13. The method as recited in claim 12 further comprising maintaining, by the controller, information indicative of states of the multiple hardware components requested by software associated with the semiconductor device.

14. The method as recited in claim 13 further comprising:
determining, by the controller, a hardware component of the multiple hardware components for switching a corresponding state based on the information related to the current states and the information indicative of requested states of the multiple hardware components; and
gradually turning on the hardware component determined during the transition period by limiting electric current dissipated to the hardware component determined.

* * * * *